United States Patent
Huynh et al.

(10) Patent No.: US 9,178,413 B2
(45) Date of Patent: Nov. 3, 2015

(54) POWER FACTOR CORRECTION AUTODETECT

(71) Applicant: Active-Semi, Inc., Road Town, Tortola (VG)

(72) Inventors: Steven Huynh, Fremont, CA (US); Hue Khac Trinh, Hanoi (VN); Khanh Quang Dinh, HungYen Province (VN); Duong Cong Le, HaiPhong (VN); Degang Xia, Allen, TX (US)

(73) Assignee: Active-Semi, Inc., British Virgin Islands (VG)

( * ) Notice: Subject to any disclaimer, the term of this patent is extended or adjusted under 35 U.S.C. 154(b) by 42 days.

(21) Appl. No.: 14/083,648

(22) Filed: Nov. 19, 2013

(65) Prior Publication Data

US 2015/0138856 A1    May 21, 2015

(51) Int. Cl.
  *H02M 1/42* (2007.01)
  *H02M 1/00* (2007.01)
  *H02M 7/217* (2006.01)
  *H02M 3/335* (2006.01)

(52) U.S. Cl.
  CPC ...... *H02M 1/4225* (2013.01); *H02M 2001/008* (2013.01); *H02M 2001/0012* (2013.01); *H02M 2001/0032* (2013.01)

(58) Field of Classification Search
  USPC .......... 363/89, 21.12; 327/283; 323/205, 207, 323/222
  See application file for complete search history.

(56) References Cited

U.S. PATENT DOCUMENTS

| | | | |
|---|---|---|---|
| 6,522,113 B1 * | 2/2003 | Betten | 323/282 |
| 7,106,603 B1 * | 9/2006 | Lin et al. | 363/21.08 |
| 8,102,679 B2 * | 1/2012 | Gong et al. | 363/21.12 |
| 8,111,050 B2 * | 2/2012 | Sutardja et al. | 323/207 |
| 8,264,860 B2 * | 9/2012 | Green | 363/41 |
| 8,278,900 B2 * | 10/2012 | Strijker et al. | 323/284 |
| 2003/0222633 A1 * | 12/2003 | Hwang | 323/282 |
| 2011/0216560 A1 * | 9/2011 | Ye | 363/21.15 |
| 2012/0025735 A1 * | 2/2012 | Wang et al. | 315/294 |
| 2012/0092900 A1 * | 4/2012 | Orr | 363/21.03 |
| 2012/0223980 A1 * | 9/2012 | Hollevoet et al. | 345/690 |
| 2013/0043846 A1 * | 2/2013 | Murdock et al. | 323/205 |

* cited by examiner

*Primary Examiner* — Timothy J Dole
*Assistant Examiner* — Bryan R Perez
(74) *Attorney, Agent, or Firm* — Imperium Patent Works; T. Lester Wallace; Darien K. Wallace (57) ABSTRACT

A power supply system includes an Offline Total Power Management Integrated Circuit (OTPMIC). The OTPMIC controls a Power Factor Correction (PFC) converter, a main AC/DC converter, and a standby AC/DC converter. A PFC Autodetect circuit in the OTPMIC monitors current flow in the PFC converter. If a high power condition is detected, then the PFC Autodetect circuit enables the PFC converter. The high power condition may be a voltage drop across a current sense resistor of a predetermined voltage for a predetermined time, within one half period of the incoming AC supply voltage. If a low power condition is detected, then the PFC Autodetect circuit disables the PFC converter. The PFC Autodetect circuit stores an IMON value that determines the predetermined voltage, and a TMON value that determines the predetermined time. The IMON and TMON values are loaded into the Autodetect circuit across an optocoupler link of the standby converter.

16 Claims, 9 Drawing Sheets

POWER SUPPLY WITH STANDBY POWER AND PFC

FIG. 1

FIG. 2 POWER SUPPLY WITH STANDBY POWER AND PFC (IN MORE DETAIL)

PFC CONTROL CIRCUIT
(IN MORE DETAIL)

FIG. 3

HIGH POWER CONDITION IS DETECTED

FIG. 4

HIGH POWER CONDITION IS DETECTED

FIG. 5

LOW POWER CONDITION IS DETECTED

POWER FACTOR CORRECTION AUTODETECT

TECHNICAL FIELD

The described embodiments relate generally to power factor correction in power supply circuits.

BACKGROUND INFORMATION

In some applications, an AC-to-DC power supply is required that receives a single AC (Alternative Current) supply voltage and outputs multiple DC (Direct Current) supply voltages. Some of the DC supply voltages are to be supplied from the power supply at relatively high powers, whereas others may not need to be supplied at such high powers. In some instances, power factor correction is required such that the waveform of the current drawn by the power supply is made to be in phase with the phase of the waveform of the voltage received by the power supply. Improvements in such power supply circuits are desired.

SUMMARY

A power supply system includes an input electromagnetic interference (EMI) filter, a bridge rectifier, and an input smoothing capacitor, and a novel Offline Total Power Management Integrated Circuit (OTPMIC). The OTPMIC includes a Power Factor Correction (PFC) control circuit portion that controls an external PFC boost converter circuit. The OTPMIC also includes a main AC/DC control circuit portion that controls an external main AC/DC converter circuit. The OTPMIC also includes a standby AC/DC control circuit portion that controls an external standby AC/DC converter circuit.

The EMI filter, the bridge rectifier, the input smoothing capacitor, the PFC control circuit portion and the external PFC circuit together form a PFC boost converter AC/DC converter. When enabled, the PFC boost converter receives an input AC supply voltage (for example, 110 volts AC RMS 60 Hertz wall power) and outputs a 400 volt DC supply voltage. When disabled, the PFC boost converter receives the input AC supply voltage but only performs peak rectification, and outputs a peak rectified DC supply voltage. If, for example, the input AC supply voltage is a 110 volt AC signal, then the peak rectified output DC supply voltage is about 156 volts.

The EMI filter, the bridge rectifier, the input smoothing capacitor, the PFC AC/DC converter, the main AC/DC control circuit portion and the external main AC/DC converter circuit together form a main AC/DC converter. The main AC/DC control portion and external main AC/DC converter circuitry of the AC/DC converter receives the DC supply voltage from the output of the PFC boost converter (either 400 volts DC if PFC is on or 156 volts DC if PFC is off). The main AC/DC control portion and external main AC/DC converter circuitry of the AC/DC converter then outputs a first DC supply voltage at a relatively high power. The main AC/DC converter can be turned on and turned off.

The EMI filter, the bridge rectifier, the input smoothing capacitor, the PFC AC/DC converter, the standby AC/DC control portion and the external standby AC/DC converter circuit together form a standby AC/DC converter. The standby AC/DC control portion and external standby AC/DC circuitry of the standby AC/DC converter receives the DC supply voltage from the output of the PFC boost converter (either 400 volts DC or 156 volts DC). The standby AC/DC control portion and external standby AC/DC circuitry of the standby AC/DC converter then outputs a second DC supply voltage at a relatively low power. Typically the standby AC/DC converter is not turned off if the power supply system is operating. The main AC/DC converter, however, may be turned off if it is not required.

In one novel aspect, the PFC control circuit portion of the OTPMIC includes a current sense amplifier circuit, a PFC Pulse Width Modulator (PWM), and a novel PFC Autodetect circuit. The novel PFC Autodetect circuit supplies an enable/disable signal EN/DISB to the PFC PWM. If the EN/DISB signal has a first digital logic value, then the PFC PWM operates to control a switch of the external PFC circuit so that the switch is pulse width modulated and so that the external PFC circuit operates as a boost AC/DC converter having a PFC functionality. If the EN/DISB signal has a second digital logic value, then the PFC pulse width modulator is disabled and does not control the switch to switch. The switch remains off. Rather than operating as a boost converter, the external PFC circuit operates as a peak rectifier.

The PFC Autodetect circuit is operable in a PFC Autodetect mode. In the PFC autodetect mode, if the PFC Autodetect circuit is initially in an autodetect state in which it is disabling the PFC PWM, then the PFC Autodetect circuit monitors current flow in the external PFC circuit. Current flow may be monitored by monitoring a voltage drop across a current sense resistor RSENSE in the main current path within the external PFC circuit. If a high power condition is detected, then the PFC Autodetect circuit switches autodetect state so that the PFC Autodetect circuit asserts the EN/DISB signal high and enables the PFC PWM. In one example, the high power condition is detected as follows. If, in a half period of the incoming AC supply voltage the voltage drop across the sense resistor RSENSE is detected to exceed a first predetermined voltage continuously for a predetermined amount of time, then the PFC Autodetect circuit determines that the high power condition has been detected.

In the PFC autodetect mode, if the PFC Autodetect circuit is in the autodetect state in which the PFC PWM is enabled, then the PFC Autodetect circuit monitors the current flow in the external PFC circuit. If a low power condition is detected, then the PFC Autodetect circuit switches the autodetect state so that the PFC Autodetect circuit asserts the EN/DISB to a low digital logic level and disables the PFC pulse width modulator. One example of detecting such a low power condition is as follows. If the voltage drop across the sense resistor RSENSE is detected to remain below a second predetermined voltage throughout each half period of six consecutive half periods of the incoming AC supply voltage, then the PFC Autodetect circuit determines that the low power condition is detected.

In one example, the novel PFC Autodetect circuit has a PFC ON bit and a PFC OFF bit. If the PFC OFF bit is set, then the PFC Autodetect circuit outputs the EN/DISB signal to disable the PFC pulse width modulator regardless of the value of the PFC ON bit. If the PFC ON bit is set and the PFC OFF bit is cleared, then the PFC Autodetect circuit outputs the EN/DISB signal to enable the PFC pulse width modulator. If the PFC ON bit is cleared and the PFC OFF bit is cleared, then the PFC Autodetect circuit operates in the PFC autodetect mode described above.

In one example, the PFC Autodetect circuit stores a multi-bit digital value IMON. The IMON value determines the first predetermined voltage. The first predetermined voltage may, for example, be a voltage proportional to the digital value of IMON. The second predetermined voltage may be fixed fraction (for example, one sixth) of the first predetermined voltage. The PFC Autodetect also stores a multi-bit digital value TMON. The TMON value determines the predetermined about of time. The predetermined amount of time may, for example, be the period of an 8 kHz clock signal multiplied by the digital value of TMON.

In one example, the standby AC/DC converter has an optocoupler link between the secondary side of the standby AC/DC converter and the primary side of the AC/DC converter. Digital information is sent by a processor powered from the standby power supply voltage, and is communicated across this optocoupler link along with analog feedback information, to the OPTMIC. On the OPTMIC the analog feedback information is used by the standby AC/DC control circuit portion for voltage regulation purposes in the standby AC/DC converter. On the OPTMIC the digital information is communicated to the PFC control circuit portion. In one example the digital information includes the IMON value, the TMON value, the PFC ON bit value and the PFC OFF bit value. Once received, these digital values are then stored in appropriate registers and flip-flops in the PFC control circuit portion. The processor that is powered from the standby supply voltage can therefore configure and control the PFC Autodetect circuit even if the main AC/DC converter is turned off.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 1:
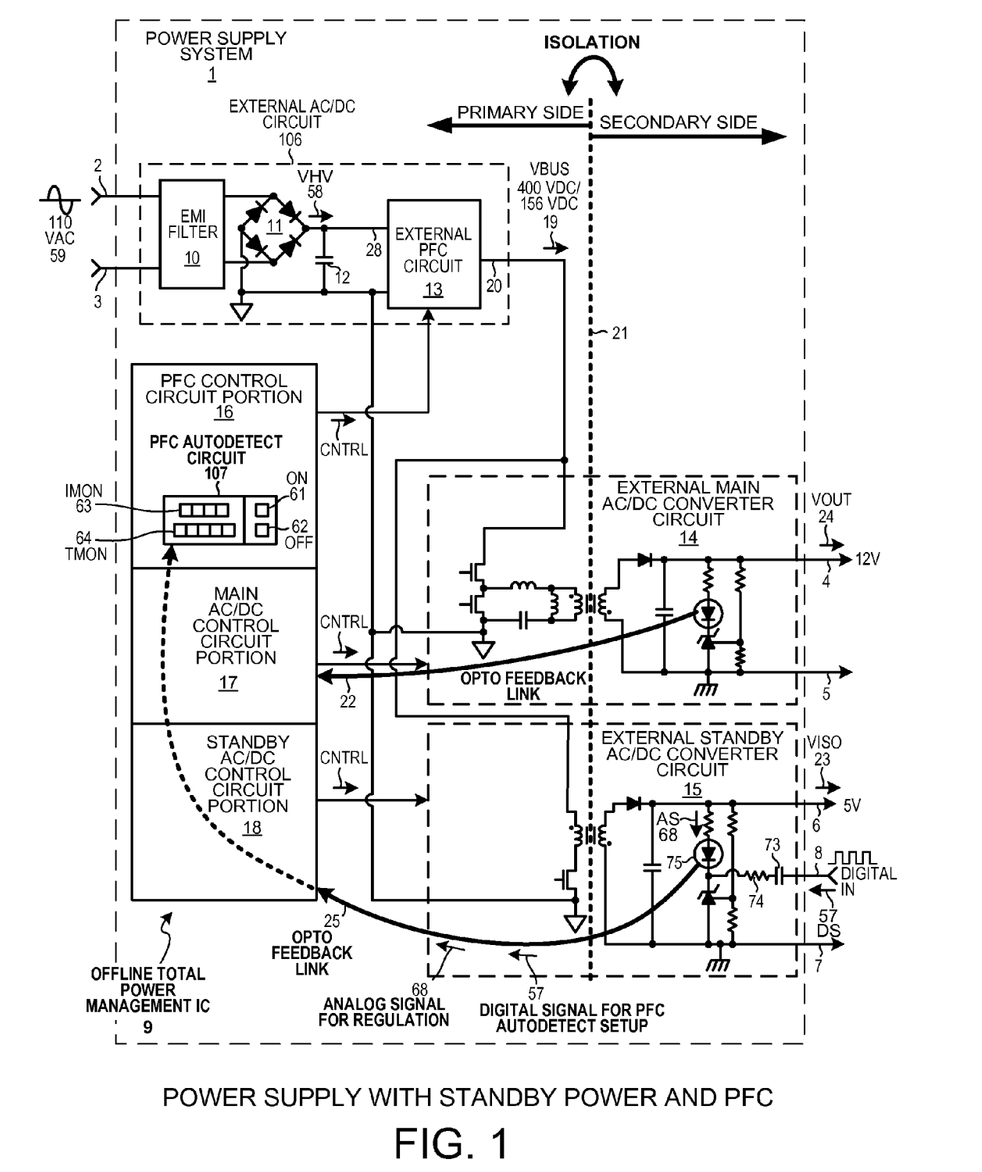
FIG. 1 is a block diagram of a power supply system that involves a novel Offline Power Management Integrate Circuit (OPMIC).

FIG. 1 is a simplified diagram of a power supply system 1. System 1 includes AC supply voltage input terminals 2 and 3, a first voltage output terminal 4 and ground terminal 5, a second voltage output terminal 6 and ground terminal 7, a digital input terminal 8, an Offline Total Power Management Integrated Circuit (OTPMIC) 9, an EMI filter 10, a full bridge rectifier 11, an input smoothing capacitor 12, an external Power Factor Correction (PFC) circuit 13, an external main AC/DC converter circuit 14, and an external standby AC/DC converter circuit 15. The circuits 13, 14 and 15 are "external" in the sense that they are external to the OTPMIC 9.

OTPMIC 9 includes a PFC control circuit portion 16, a main AC/DC control circuit portion 17, and a standby AC/DC control circuit portion 18. The PFC control circuit portion 16 controls the external PFC circuit 13 so that together the circuits 10, 11, 12, 16 and 13 form a boost AC/DC converter. External AC/DC circuit 106 is the external portion of this boost AC/DC converter. The phase of the waveform of the current that the boost AC/DC converter draws from input terminals 2 and 3 substantially matches the phase of the sinusoidal 110 volt RMS AC supply voltage waveform on terminals 2 and 3. If the external PFC circuit 13 is enabled, then the external PFC circuit 13 outputs a rough 400 volt DC supply voltage VBUS 19 onto output node and conductor 20. If, however, the external PFC circuit 13 is disabled when the power supply 1 is powered, then the external PFC circuit 13 outputs a peak rectified version of the AC input supply voltage onto conductor 20. Where the AC input supply voltage is a 60 Hertz, 110 volt AC RMS signal, the voltage output onto conductor 20 is a 156 volt DC signal. When the external PFC circuit 13 is disabled, it is not performing power factor correction control of the phase of the current being drawn from the 110 VAC input terminals 2 and 3.

The main AC/DC control circuit portion 17 controls the external main AC/DC converter circuit 14 so that together the circuits 10, 11, 12, 16, 13, 17 and 14 form what is referred to here as the main AC/DC converter. If enabled, the external main AC/DC converter circuit 14 receives power (either 400 volts DC or 156 volts DC) from conductor 20 and outputs the supply voltage VOUT 24 onto VOUT terminal 4. The main AC/DC converter circuit 14 here actually receives a rough DC voltage and outputs a DC voltage and in that sense is a DC/DC converter circuit, but circuit 14 is nonetheless referred to here as an AC/DC converter circuit because it is part of the overall main AC/DC converter. VOUT in this case is 24 volts DC. The vertical dashed line 21 in FIG. 1 indicates the secondary side of the main AC/DC converter that is isolated from the primary side of the main AC/DC converter. An optocoupler link 22 between the secondary side and the primary side provides feedback back to the main AC/DC control circuit portion 17. The main AC/DC control circuit portion 17 uses the feedback signal for output voltage regulation purposes.

The standby AC/DC control circuit portion 18 controls the external standby AC/DC converter circuit 15 so that together circuits 10, 11, 12, 16, 13, 18 and 15 form a standby AC/DC converter. The standby AC/DC converter circuit is a "standby" converter in the sense that it continues to output a VISO voltage supply signal 23 (for example, 5 volts DC) throughout the time that the system 1 is powered, regardless of whether the main AC/DC converter circuit is disabled or is not disabled. If the main AC/DC converter is enabled, then the main AC/DC converter outputs the VOUT voltage supply signal 24 (for example, 12 volts DC). If disabled, then main AC/DC converter circuit does not output the VOUT voltage supply signal 24. The standby AC/DC converter has a smaller output power capability as compared to the larger output power capability of the main AC/DC converter. The standby AC/DC converter may for example be rated to output ten watt maximum, whereas the main AC/DC converter may be rated to output five hundred watts maximum. The external standby AC/DC converter circuit 15 receives power (either 400 volts DC or 156 volts DC) from conductor 20 and outputs the supply voltage signal VISO 23 onto terminal 6. As in the case of the main AC/DC converter circuit discussed above, the standby AC/DC converter circuit 15 here actually receives a rough DC voltage and outputs a DC voltage and in that sense is a DC/DC converter circuit, but circuit 15 is nonetheless referred to here as an AC/DC converter circuit because it is part of the overall standby AC/DC converter. In FIG. 1, the vertical dashed line 21 indicates the secondary side of the standby AC/DC converter that is isolated from the primary side. Note that the ground symbols used on the right side of line 21 are different from the ground symbols used on the left side of line 21. An optocoupler link 25 extends between the secondary side and the primary side and provides analog feedback back to the standby AC/DC control circuit portion 18. The standby AC/DC control circuit portion 18 uses the analog feedback signal for output voltage regulation purposes. In addition, as set forth in more detail below, a digital signal DS is communicated across the optocoupler link and is used to setup and control a novel PFC Autodetect circuit 107 located within the PFC control portion 16 of OTPMIC 9.

Figure 2:
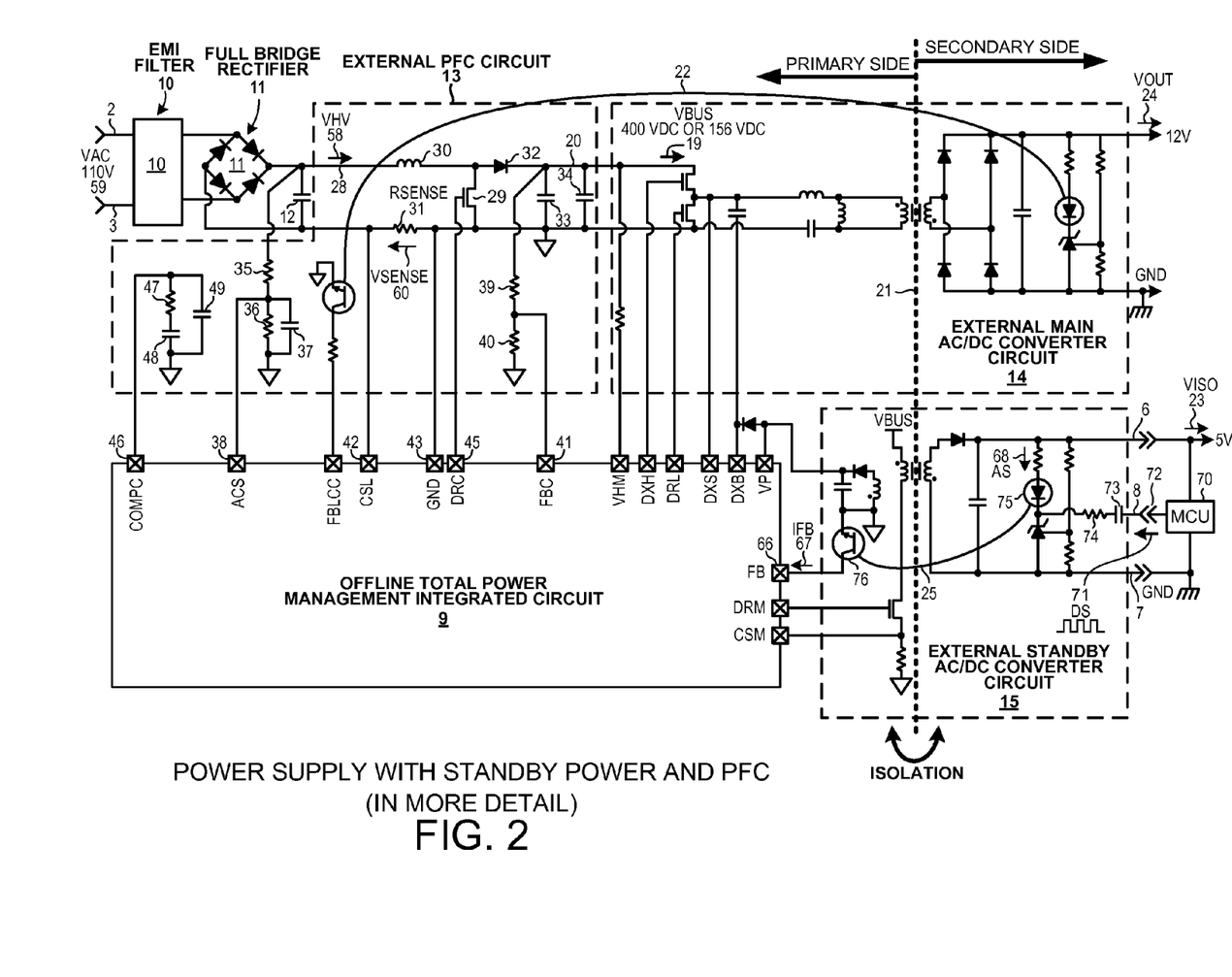
FIG. 2 is a more detailed diagram of the system of FIG. 1.

FIG. 2 is a more detailed diagram of the system 1 of FIG. 1. In the particular example illustrated, the main AC/DC converter has an LLC resonant converter topology. In the particular example illustrated, the standby AC/DC converter has a flyback converter topology.

Figure 3:
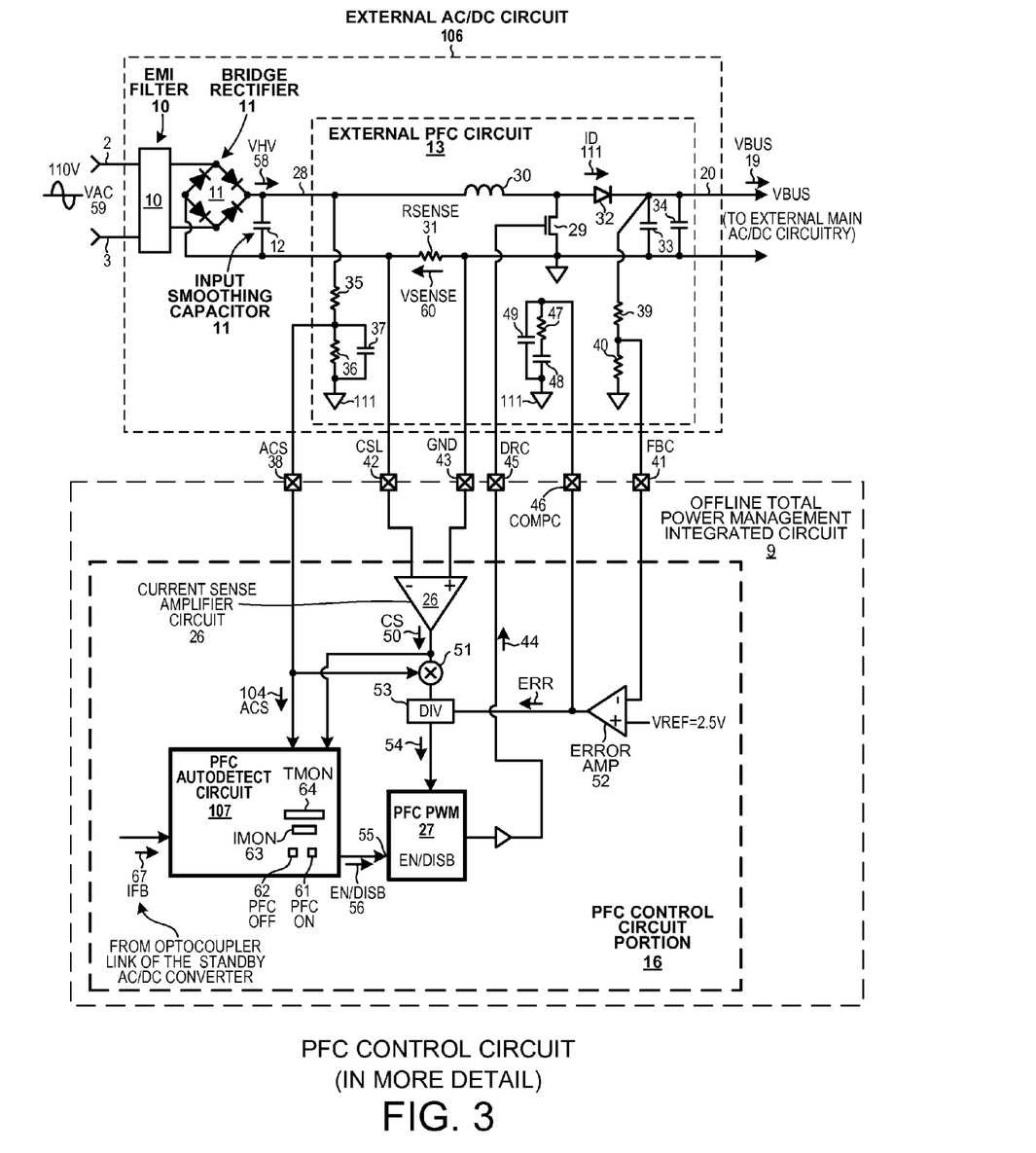
FIG. 3 is a diagram of the PFC control circuit portion of the OPMIC of FIG. 1.

FIG. 3 is a more detailed diagram of the power factor correction boost converter of FIGS. 1 and 2. The PFC control circuit portion 16 of the offline total power management IC 9 includes a current sense amplifier circuit 26, a PFC Pulse Width Modulator (PWM) 27, and the novel PFC Autodetect circuit 107. The 110 volt AC supply voltage 59 received via terminals 2 and 3 is filtered by EMI filter 10 and is full wave rectified by bridge rectifier 11 to generate a full wave and peak rectified signal VHV 58 on input node and conductor 28. When switch 29 is turned on, an increasing current is made to flow from the conductor 28, through inductor 30, through the switch 29, and through a sense resistor RSENSE 31. As this current increases, energy is stored in the inductor. The switch 29 is then turned off. Continued current flow through inductor 30 now flows through the inductor 30, through the rectifying diode 32, thereby charging capacitors 33 and 34. The switch 29 is then turned on again, and the cycle repeats. As is known in the art, the duty cycle of the turning on and off of the switch 29 is controlled so that the overall phase of the current waveform of the current being drawn through terminals 2 and 3 is in phase with the voltage waveform of the 110 VAC supply voltage 59 present on terminals 2 and 3. The PFC control circuit portion 16 controls the switch 29.

The PFC control circuit portion 16 monitors VHV 58 present on input node and conductor 28 through a resistor voltage divider circuit involving resistors 35 and 36 and capacitor 37. The ACS signal 104 received onto the integrated circuit 9 via ACS terminal 38 is therefore a fixed fraction of the voltage of signal VHV 58. The PFC control circuit portion 16 also monitors VBUS 19 present on output node and conductor 20 through a resistor voltage divider circuit involving resistors 39 and 40. The voltage received onto the integrated circuit 9 via FBC terminal 41 is therefore a fixed fraction of the voltage of signal VBUS 19 on conductor 20. The PFC control circuit portion 16 also monitors the voltage VSENSE 60 dropped across sense resistor RSENSE 31 via terminal GND 43, terminal CSL 42, and current sense amplifier circuit 26. The PFC control circuit portion 16 controls the switch 29 of the external PFC circuit 13 by driving a control signal 44 out of terminal DRC 45. Terminal COMPC 46 is a terminal for coupling an external compensation circuit 47, 48 and 49 to circuitry inside the integrated circuit.

The power factor control circuitry may be realized in numerous different ways that are known in the art. In the illustrated example, current sense amplifier circuit 26 outputs a current sense signal CS 50. The magnitude of current sense signal CS 50 is a scaled version of the voltage drop across current sense resistor RSENSE 31. This voltage CS 50 is multiplied by analog multiplier circuit 51 with the voltage divided version of signal VHV 58. Error amplifier 52 compares the voltage divided version of signal VBUS 19 received via terminal 41 with a 2.5 volt voltage reference signal and outputs an error signal ERR. An analog divider circuit 53 divides the signal output by the multiplier 51 by the error signal ERR output by the error amplifier 52 to generate a control signal 54. The level of the control signal 54 controls the pulse width of the drive signal 44 output by the pulse width modulator PFC PWM 27. If PFC PWM 27 is enabled, then switch 29 is pulse width modulated on and off as described above to make sure that the phase of the current drawn through terminals 2 and 3 substantially matches the phase of the voltage VAC received on terminals 2 and 3.

The PFC PWM 27, however, has an input control lead 55 that receives a digital enable/disable 56 signal EN/DISB 56 from the novel PFC Autodetect circuit 107. If the EN/DISB signal has a high digital logic value, then the PFC PWM 27 is enabled and operates as set forth above to carry out power factor correction. If the EN/DISB signal has a low digital logic value, then the PFC PWM 27 is disabled such that switch 29 is off and remains off.

In the example illustrated, the PFC Autodetect circuit 107 stores a PFC ON bit value 61, a PFC OFF bit value 62, a 4-bit IMON value 63, and a 5-bit TMON value 64. These bits can be stored in a single register, or may be stored in multiple registers and/or flip-flops and/or other sequential logic elements. If the PFC OFF bit is set, then the PFC Autodetect circuit 107 is disabled regardless of the values of the PFC ON bit, the value of IMON, and the value of TMON. When the PFC Autodetect circuit 107 is disabled, the EN/DISB signal 56 supplied to PFC PWM 27 is a low digital logic level and the PFC PWM 27 is disabled.

If the PFC OFF bit value is cleared, then the PFC Autodetect circuit 107 may be set always to drive the EN/DISB signal 56 to a high digital logic value, or the PFC Autodetect circuit 107 may be set to operate in its autodetect mode. If the PFC ON bit is set when the PFC OFF bit is cleared, then the PFC Autodetect circuit is set always to drive the EN/DISB signal 56 to the high digital logic value. If, however, the PFC ON bit is cleared when the PFC OFF bit is cleared, then the PFC Autodetect circuit is set to operate in the autodetect mode.

In the autodetect mode, the PFC Autodetect circuit 107 may be in an autodetect state in which the EN/DISB signal 56 is at a high digital logic level, or the PFC Autodetect circuit 107 may be in an autodetect state in which the EN/DISB signal 56 is at a high digital logic level. If the PFC Autodetect circuit 107 is in the state in which the EN/DISB signal 56 is at the high digital logic level, then the PFC Autodetect circuit 107 monitors the voltage drop across the current sense resistor RSENSE 31 and if a high power condition is detected, then the PFC Autodetect circuit 107 switches the autodetect state to the state that asserts the EN/DISB signal, thereby enabling the PFC PWM 27. One example of detecting such a high power condition is as follows. If, in a half period of the incoming AC supply voltage signal 59 on terminals 2 and 3, the voltage drop across RSENSE 31 is detected to exceed a first predetermined voltage for a predetermined amount of time, then the autodetect state of the PFC Autodetect circuit 107 is switched so that the PFC Autodetect circuit 107 then asserts the EN/DISB signal 56 to a high digital logic level. If, in a half period of the incoming AC supply signal 59 on terminals 2 and 3, the voltage drop across RSENSE 31 is not detected to exceed the first predetermined voltage for the predetermined amount of time, then the autodetect state of the PFC Autodetect circuit 107 is not switched and EN/DISB signal 56 continues to be output from the PFC Autodetect circuit 107 at a low digital logic level.

If the PFC Autodetect circuit 107 is in the autodetect state in which the EN/DISB signal 56 is at the high digital logic level, then the PFC Autodetect circuit 107 monitors the voltage drop across the current sense resistor RSENSE 31. If a low power condition is detected then the PFC Autodetect circuit 107 switches the autodetect state so that the EN/DISB signal 56 is a digital low logic level, thereby disabling the PFC PWM 27. One example of detecting such a low power condition is as follows. If the voltage drop across RSENSE is detected to be below a second predetermined voltage throughout one entire half period, of each of six consecutive half periods of the incoming VAC signal on terminals 2 and 3, then the low power condition is detected. If the low power condition is detected, then state of the PFC Autodetect circuit 107 is switched so that the PFC Autodetect circuit 107 then asserts the EN/DISB signal 56 to a low logic level. If, on the other hand, the low power condition is not detected, then the PFC Autodetect circuit 107 does not switch states and continues to output the EN/DISB signal 56 at the high digital logic state.

In one example, the 4-bit value IMON sets the first predetermined voltage. The first predetermined may, for example, be a voltage proportional to the digital number IMON. The second predetermined voltage is a fixed fraction of the first predetermined voltage. The second predetermined voltage may, for example, be one sixth of the first predetermined voltage. The 5-bit value TMON sets the predetermined amount of time. The predetermined amount of time may, for example, be the product of the period of a clock signal multiplied by the digital number TMON.

In the illustrated example, the PFC Autodetect circuit 107 receives a digital signal 57 that is communicated across the optocoupler link 25 from the secondary side of the standby AC/DC converter and into the OTPMIC integrated circuit 9 via a feedback terminal FB. The actual signal communicated across the optocoupler link 25 is a signal IFB 67 that includes a low frequency analog signal (AS) 68 with the higher frequency digital signal (DS) 57 modulated onto the analog signal AS 68. The digital signal DS 57 received in this manner is used to setup and control the PFC Autodetect circuit 107 by loading register and flip-flops in the PFC Autodetect circuit 107 that store the PFC ON, PFC OFF, IMON and TMON values. The low frequency analog signal AS 68 is used by the standby AC/DC controller circuit portion 18 for feedback voltage regulation purposes. The digital signal DS 57 as described above is supplied to the PFC control circuit portion 16 and is used to setup the PFC Autodetect circuit 107.

Figure 4:
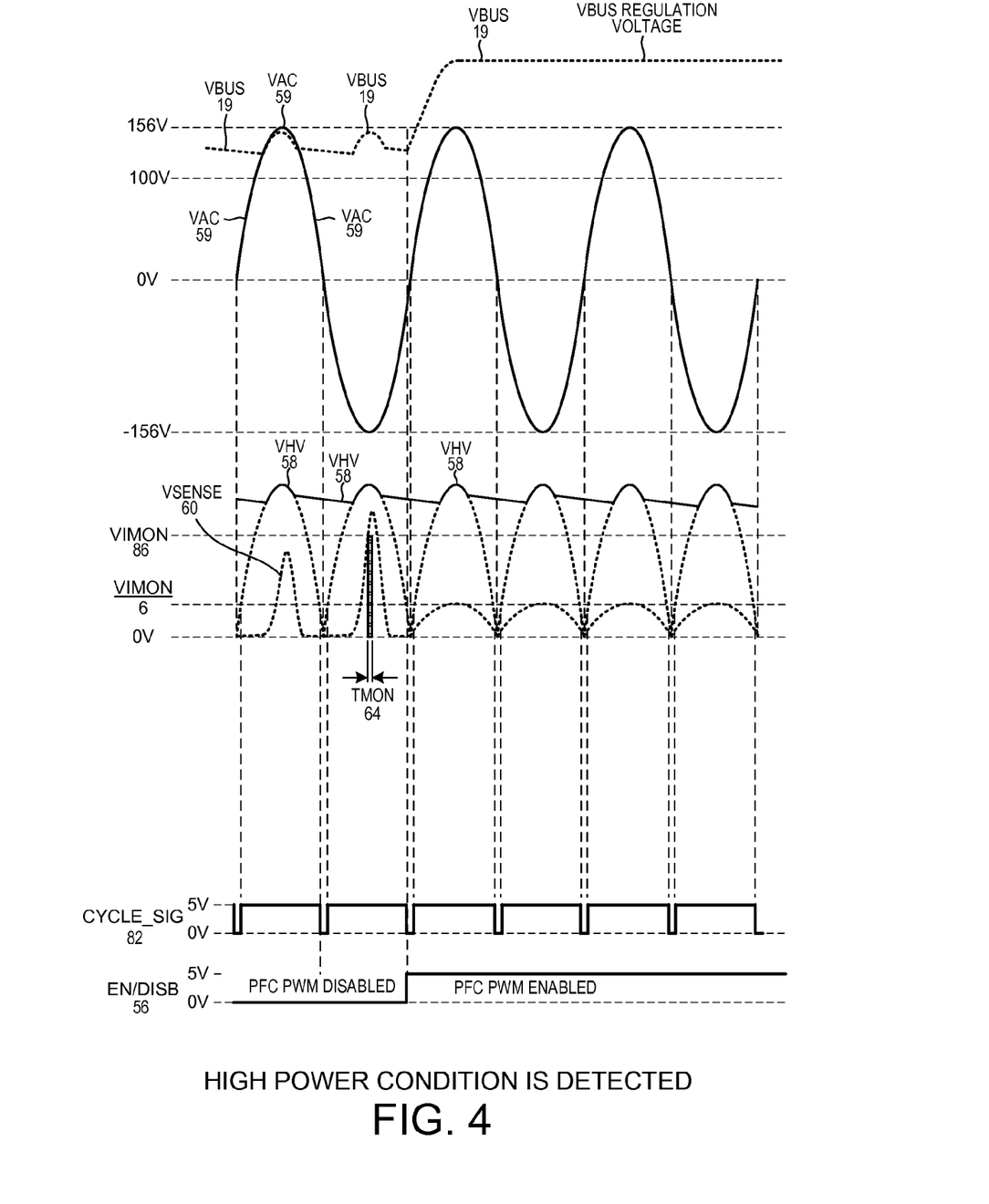
FIG. 4 is a waveform diagram that illustrates how the PFC Autodetect circuit of the PFC control circuit portion of FIG. 3 detects a high power condition.

FIG. 4 is a waveform diagram that illustrates how the PFC Autodetect circuit 107 detects the high power condition in the autodetect mode, in one example. When the PFC Autodetect circuit 107 is in the state in which the EN/DISB signal 56 is at a digital logic low level, then the PFC function is disabled and the external PFC circuit 13 operates as a diode peak rectifier. Because the incoming AC supply voltage signal 59 on terminals 2 and 3 is a 110 volt RMS signal, the peak voltage is approximately 156 volts. The waveform labeled VBUS 19 in FIG. 4 represents the peak rectified signal VBUS on conductor 20. The full bridge rectifier 11 rectifies the incoming sinusoidal 110V RMS voltage 59 to generate the full wave and peak rectified signal VHV 58 on conductor 28. The waveform labeled VHV in FIG. 4 represents the full wave and peak rectified signal VHV 58. A surge of current flows through the rectifying diode 32 once every half period of the incoming sinusoidal signal. The surge of current flows back to the rectifier 11 through RSENSE 31. The waveform labeled VSENSE 60 in FIG. 4 represents the voltage drop across the current sense resistor RENSE 31. In the high power condition illustrated, during each half period of the incoming 110 volt AC signal 59 the peak magnitude of VSENSE 60 exceeds the first predetermined voltage by the amount of time TMON 64. In the diagram, the first predetermined voltage is represented as VIMON, and the predetermined amount of time is represented as TMON. VIMON is a voltage proportional to the digital value IMON. TMON is equal to the digital value TMON multiplied by the period of the 8 kHz clock signal 65. In the example of the diagram of FIG. 4, the PFC Autodetect circuit 107 detects this high power condition in the second half period. In response, the PFC Autodetect circuit 107 asserts the EN/DISB signal 56 to a digital logic high value. Asserting EN/DISB high causes the PFC PWM 27 to operate and to carry out its power factor correction function.

As a result of power factor correction being enabled, the VBUS supply voltage output from the external PFC circuit 13 increases from the 156 volt peak rectified value to a rough 400 volt DC level. Also, the voltage dropped across the sense resistor RSENSE is proportional to the current drawn from the AC voltage source. As a result of power factor correction being enabled, the shape of VSENSE 60 changes from being surges of current as seen in the first two half periods to being a smooth wave shape whose phase is in phase with the phase of the incoming AC supply voltage VAC 59.

Figure 5:
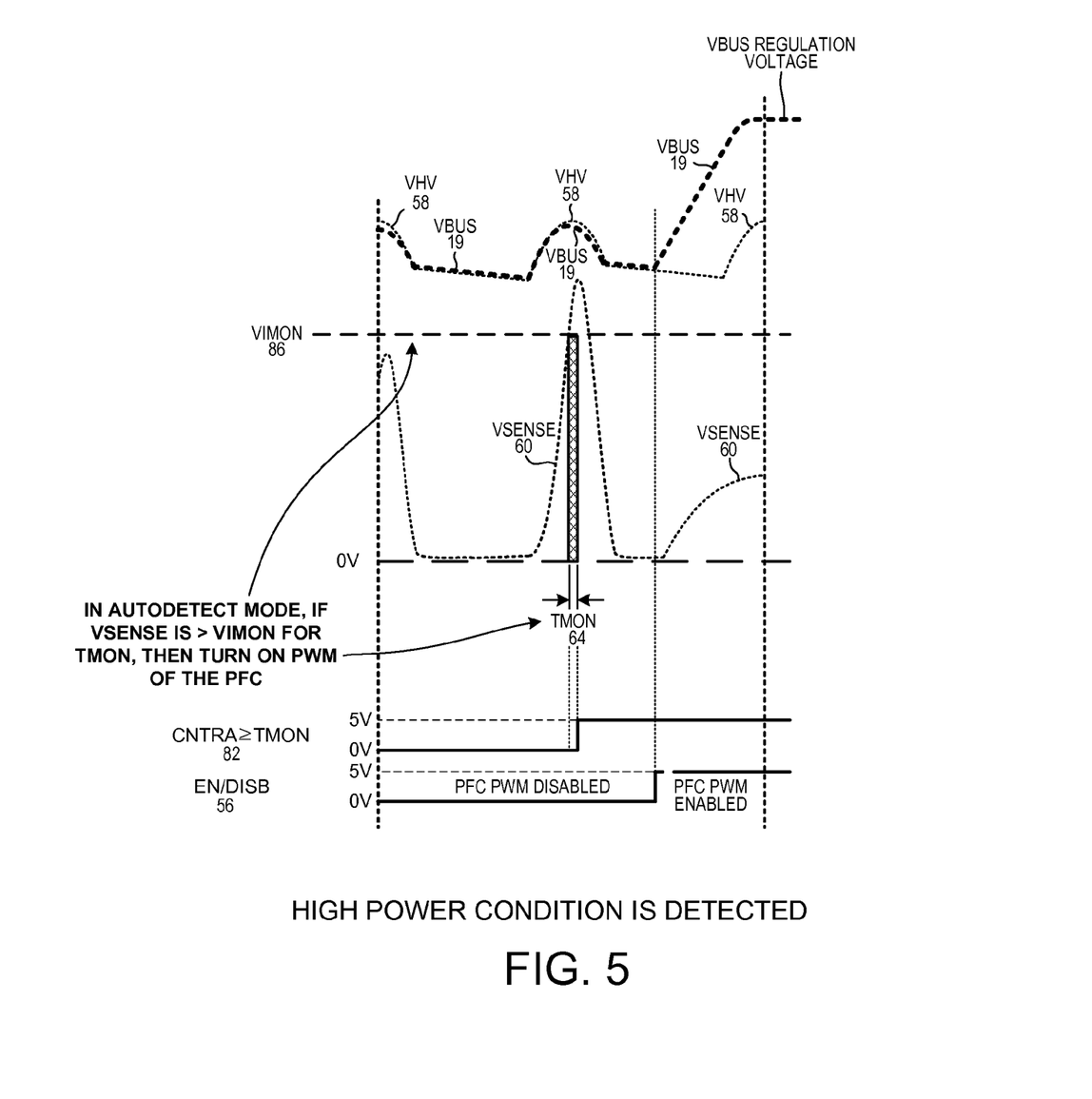
FIG. 5 is an expanded view of the second half period in the waveform diagram of FIG. 4.

FIG. 5 is an expanded view of the second half period of FIG. 4.

Figure 6:
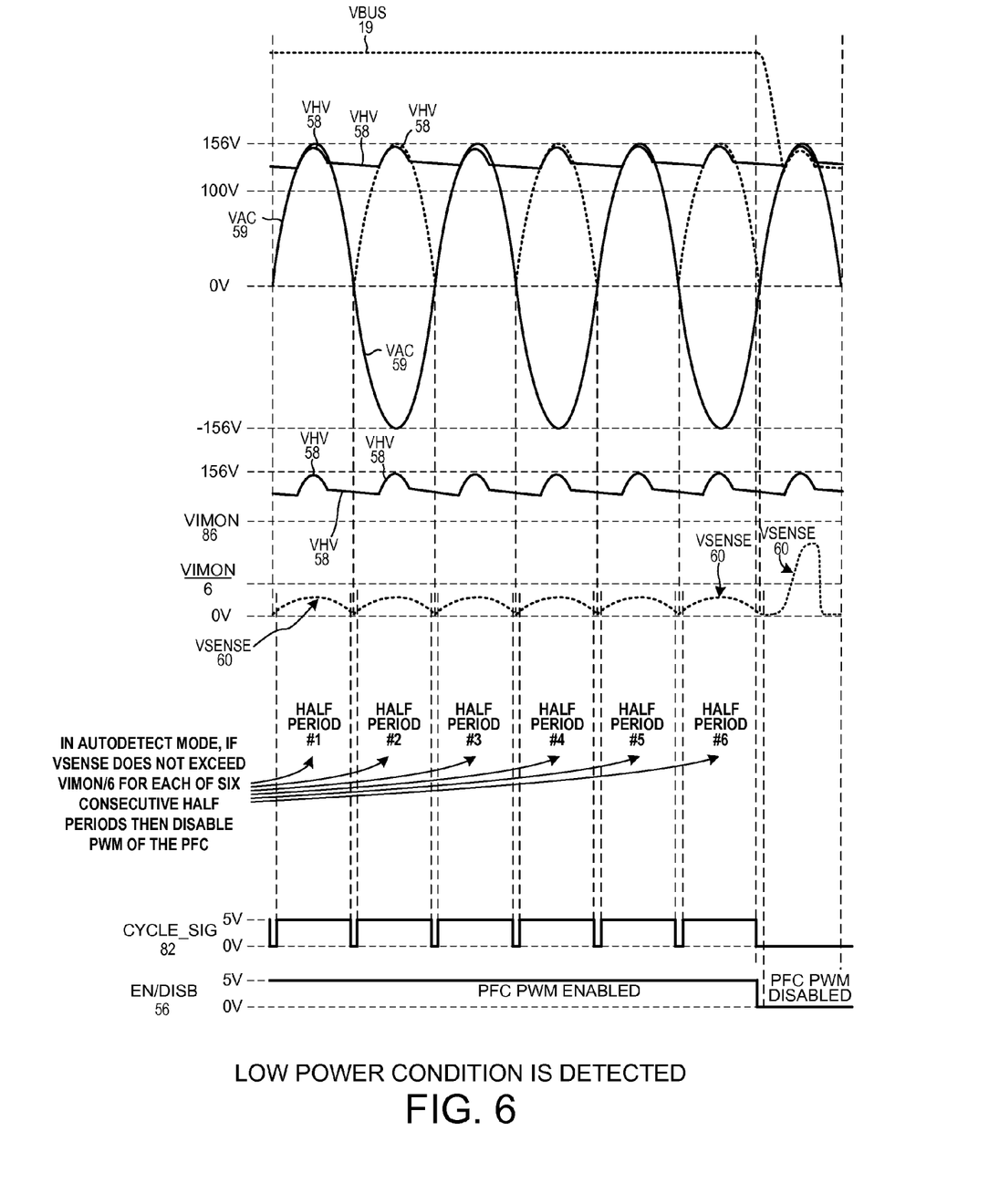
FIG. 6 is a waveform diagram that illustrates how the PFC Autodetect circuit of the PFC control circuit portion of FIG. 3 detects a low power condition.

FIG. 6 is a waveform diagram that illustrates one example of how the PFC Autodetect circuit 107 can detect the low power condition in the PFC Autodetect mode. The PFC Autodetect circuit 107 starts off in the autodetect state in which the EN/DISB signal 56 is at the digital logic high level. The PFC PWM 27 is therefore enabled and the external PFC circuit 13 is controlled to operate as a boost converter with power factor correction. The waveform labeled VSENSE 60 represents the waveform of the voltage drop across sense resistor RSENSE 31. Each voltage surge is due to a surge of current flowing through the rectifying diode 32. The PFC Autodetect circuit 107 detects that the magnitude of the signal VSENSE 60 does not rise above the second predetermined voltage (VIMON/6 in this example) at any time during each half period of six consecutive half periods of the VAC input signal 59. At the end of the sixth half period, the PFC Autodetect circuit 107 determines that the low power condition has been detected and in response switches state to assert the EN/DISB signal 56 high. Asserting EN/DISB high turns off the PFC PWM 27. As a result of power factor correction being disabled, the magnitude of supply voltage VBUS 19 as output by the external PFC circuit 13 decreases in magnitude from its 400 volt DC value down to its full wave rectified value of about 156 volts DC.

Figure 7:
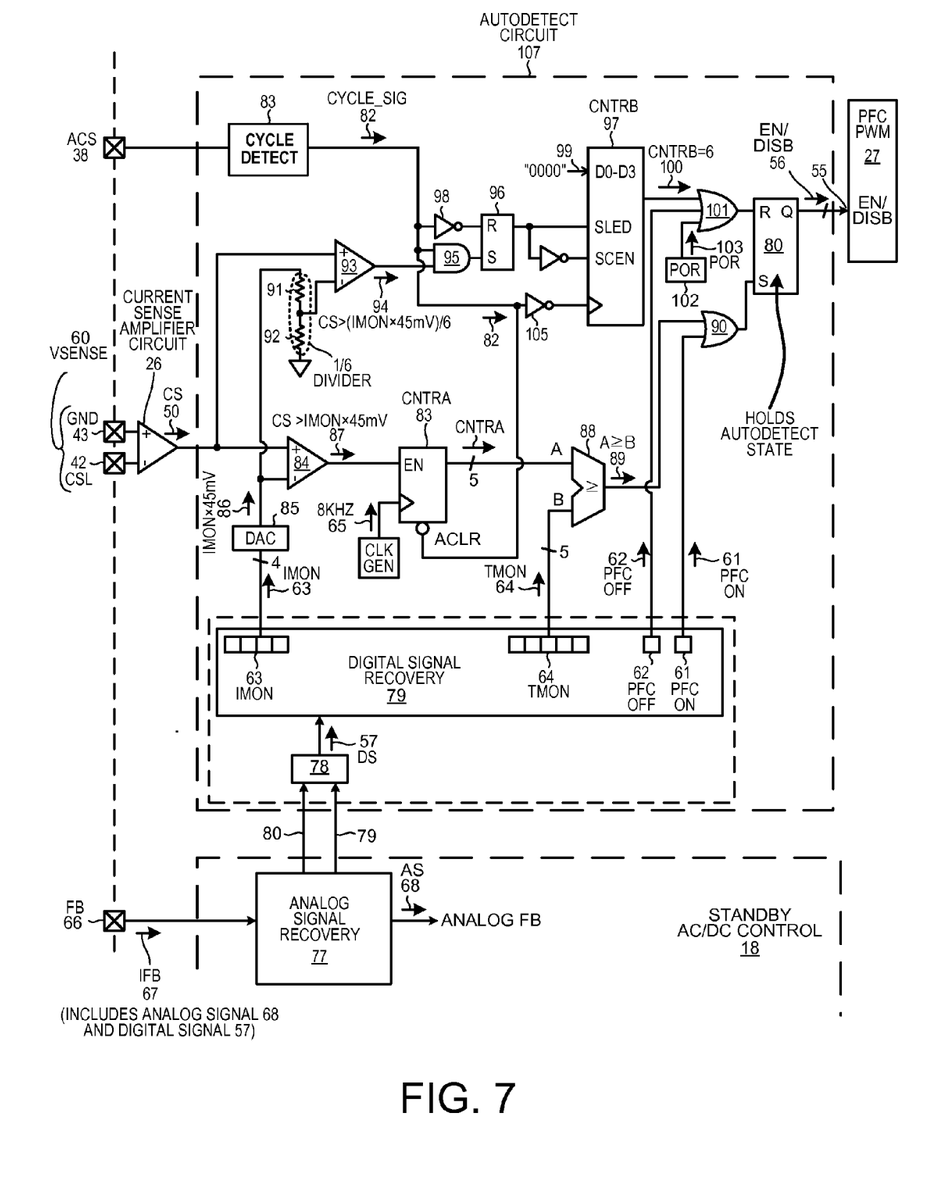
FIG. 7 is a more detailed circuit diagram of one example of the PFC Autodetect circuit.

FIG. 7 is a circuit diagram of one example of the novel PFC Autodetect circuit 107. The novel PFC Autodetect circuit can be realized in many different ways and may incorporate many different features. The circuit of FIG. 7 is but one specific example of a circuit that performs the PFC Autodetect function. It is not a large digital processor-based circuit that involves the execution of instructions, but rather is a robust, hardwired, and dedicated circuit that is programmable but that does not execute instructions. As shown in FIG. 2, a circuit 70 such as microcontroller MCU is located on the secondary side of the isolation line 21. The circuit 70 is powered from the standby AC/DC converter supply voltage VISO 23. The circuit 70 supplies serial digital data signal DS 71 via connector 72, digital input terminal 8, 1 nF capacitor 73 and 5 kΩ resistor 74 so as to modulate the digital signal onto analog signal AS 68. The analog signal AS 68 is a current flowing through the LED 75 of the optocoupler. This current has a magnitude that is directly proportional to the magnitude of the voltage VISO 23. The analog signal with the digital signal DS modulated on it passes over optocoupler link 25 as signal IFB 67. A photodetector portion 76 of the optocoupler converts the light signal into a current again. The current signal IFB 67 flows from the photodetector portion 76 and into FB terminal 66 of the OTPMIC 9.

As shown in FIG. 7, signal IFB 67 is received into an analog signal recovery circuit 77 of the standby AC/DC control portion 18. Analog signal recovery circuit 77 includes a low pass filter that filters out the relatively high frequency digital signal DS, and buffers and amplifies the resulting analog signal AS, and outputs the lower frequency analog signal AS 68. The lower frequency analog signal AS 68 is used for voltage regulation purposes in the controller for the standby AC/DC converter. The analog signal recovery circuit 77 also supplies the analog component of signal IFB to an edge detector circuit 78 of PFC Autodetect circuit 107 via conductor 79. Signal IFB 67 is also supplied to the edge detector circuit 78 via conductor 80. Edge detector circuit 78 uses the signals on conductors 79 and 80 to detect rising falling edges of the digital signal that was modulated onto the analog signal. The rising edges are used to set a latch and falling edges are used to reset the latch so that the output of the latch is the recovered digital bit stream of the original digital DS signal 57 as output by the microcontroller 70. Digital signal DS 57 is supplied to UART (Universal Asynchronous Receiver Transmitter) logic of a digital signal recovery circuit 79. The microcontroller 70 sends frames of digital data across the optocoupler communication link and into the UART logic. The UART logic receives the frames, and extracts the digital data payloads. The payloads are used to control the writing of digital data into registers in the digital signal recovery circuit 79. For example, PFC ON bit 61, PFC OFF bit 62, and IMON 63 may be stored in a first such register, and TMON 64 may be stored in a second such register. By using UART communication to write appropriate values into these registers, the microcontroller 70 sets up the PFC Autodetect circuit 107 for subsequent operation.

The autodetect state of the PFC Autodetect circuit 107 is stored in an SR latch 80. If SR latch 80 is set, then the EN/DISB signal 56 is a digital logic high level. If SR latch 80 is cleared, then the EN/DISB signal 56 is a digital logic low level.

Assume for explanation purposes here that the PFC Autodetect circuit is in the state in which EN/DISB signal 56 is at a digital logic level low. SR latch is therefore cleared. Further assume that neither the PFC ON bit nor the PFC OFF bit is set. In such a state, the PFC Autodetect circuit 107 monitors the VSENSE voltage to detect a high power condition. A signal CYCLE_SIG 82 that defines each half period of the incoming VAC signal 59 is generated by a cycle detect circuit 83. There are multiple ways of realizing cycle detect circuit 83. In one non-limiting example, a scaled version of the incoming sinusoidal AC signal is full wave rectified and compared to a reference voltage to generate the CYCLE_SIG signal. The signal CYCLE_SIG 82 in one example pulses low between each successive half period of the incoming VAC signal 59, but otherwise is a digital logic level high. This signal CYCLE_SIG is used to asynchronously clear a counter CNTRA 83 at the beginning of each half period. The VSENSE voltage signal 60 between terminals 42 and 43 is amplified by the current sense amplifier circuit 26 to generate signal CS 50 that is proportional to VSENSE 60. This signal CS 50 is supplied onto the non-inverter input lead of a comparator 84. The 4-bit IMON value is converted into a voltage by DAC (Digital to Analog Converter) 85. The resulting signal 86 is a voltage that has a magnitude equal to IMON multiplied by 45 mV. This signal 86 is supplied onto the inverting input lead of comparator 84. If the current sense voltage signal CS 50 is higher than the voltage of signal 86, then comparator 84 asserts signal 87 to be a digital logic high. If the current sense voltage signal CS 50 is lower than the voltage of signal 86, then comparator 84 asserts signal 87 to be a digital logic low. The digital signal 87 is supplied onto a count enable CEN input of the counter CNTRA 83. After the counter CNTRA 83 has been asynchronously cleared at the beginning of a half period, if the signal 87 is a digital logic high then the counter CNTRA 83 is enabled to count. The counter increments on each rising edge of the 8 kHz signal 65. Accordingly, if the voltage drop across the sense resistor RSENSE 31 increases in the middle of a half period high enough that CS 50 exceeds the voltage of signal 86 for an amount of time during the peak of diode current flow, then the counter CNTRA 83 will be enabled to count. Digital comparator 88 compares the count output of counter CNTRA 83 with the 5-bit value TMON 64. If the count becomes equal to TMON, then the A≥B signal 89 as output by the digital comparator 88 transitions from a digital low to a digital high. Because PFC ON is a digital low, the OR gate 90 passes the rising transition to the set input of SR latch 80. The SR latch 80 is therefore set, and the EN/DISB signal 56 is made to transition from its digital logic low level to its digital logic high level. The PFC Autodetect circuit 107 therefore has transitioned state from outputting EN/DISB of a digital logic low level to outputting EN/DISB of a digital logic high level. If, however, during the half period the count output by CNTRA 83 did not reach the TMON value, then at the end of the half period the signal CYCLE_SIG 82 will pulse low and will asynchronously reset the counter CNTRA 83 without any set pulse having been sent to the SR latch 80.

Next, assume that the PFC Autodetect circuit 107 is in the autodetect state in which the SR latch 80 is outputting a digital logic high level signal 56. Further assume as above that neither the PFC ON bit nor the PFC OFF bit is set. In this state, the PFC Autodetect circuit 107 monitors VSENSE 60 to detect a low power condition. Resistors 91 and 92 form a resistor voltage divider that outputs onto the inverting input lead of comparator 93 a voltage signal that has one sixth the magnitude of voltage signal VIMON 86. The current sense signal CS 50 is supplied onto the non-inverting input lead of comparator 93. The signal 94 output by comparator 93 will therefore be at the high digital logic level if the current sense signal is higher than the voltage of signal 86 divided by six. If CYCLE_SIG 82 is low such as it is between half periods, then AND gate 95 cannot output a digital high signal to SR latch 96. But if CYCLE_SIG 82 is at a digital high level as it is during the center portion of each half period, then AND gate 95 will output a high level if the current sense signal CS 50 is higher than the voltage of signal 86 divided by six. If the voltage of the CS signal is ever higher than the voltage of signal 86 divided by six (during the center portion of a half period), then the AND gate 95 will supply a high signal onto the set input of SR latch 96, thereby causing the SR latch 96 to be set. As a result, a high signal is supplied onto the synchronous load enable SLED input lead of counter CNTAB 97. Once set, the SR latch 96 will remain latched until the end of the half cycle when CYCLE_SIG going low will cause a high signal to be supplied via inverter 98 onto the reset input of SR latch 96. Because the digital high is maintained on the SLED input lead until CYCLE_SIG goes low, the counter CNTRB 97 will be clocked when its SLED input lead is receiving a digital logic high signal. The counter CNTRB 97 will therefore parallel load in the "0000" value on its parallel input leads 99 on the falling edge of CYCLE_SIG 82 at the end of the half period. In this way, if the current sense VSENSE ever pulses high enough such that signal CS 50 exceeds the voltage of signal 86 divided by six, then at the end of the half cycle the counter CNTRB 97 will be parallel loaded with "0000", thereby effectively clearing the 4-bit counter.

If, on the other hand, VSENSE does not pulse high enough such that signal CS 50 exceeds the voltage of signal 86 divided by six (during the center portion of a half period), then the SR latch 96 will not be set. At the end of the half period when CYCLE_SIG pulses low, the synchronous load input lead SLED is receiving a digital logic low value and the synchronous count enable SCEN input lead is receiving a digital logic high value. Accordingly, on the falling edge of signal CYCLE_SIG 82 at the end of the half period, the counter CNTRB 97 increments. CNTRB 97 is clocked on the falling edges of CYCL_SIG due to inverter 105. If there are six consecutive half periods in which the voltage drop across sense resistor RSENSE 31 never got high enough to set the SR latch 96, then the CNTRB=6 signal 100 as output by counter CNTRB 97 will be asserted high. The high signal will pass through OR gate 101 and will cause the SR latch 80 to reset. Resetting the SR latch 80 causes the EN/DISB signal 56 to be asserted to a digital logic low level. Accordingly, if a low power condition is detected, then the PFC PWM 27 is disabled.

A power on reset circuit 102 outputs an active high power on reset POR signal 103. POR 103 is a high digital logic high level initially during power on of the integrated circuit. Under such circumstances, the high POR signal 103 overrides all other signals and resets the SR latch 80, thereby forcing EN/DISB 56 low and disabling the PFC PWM 27. When the power on reset condition has passed, then the POR signal 103 transitions to a low digital logic level and the POR circuit 102 has no effect on the PFC Autodetect circuit 107. If the PFC OFF bit is set, then the SR latch 80 is also forced to reset and is held in that condition. Therefore setting the PFC OFF bit causes the PFC PWM 27 to be disabled as long as PFC OFF is set. If the PFC OFF bit is not set and POR 103 is not high but if the PFC ON bit is set, then the SR latch 80 will be set and will be held in that condition. The signal EN/DISB 56 is therefore forced to a digital logic high level, and the PFC PWM 27 is held in the enabled condition.

Figure 8:
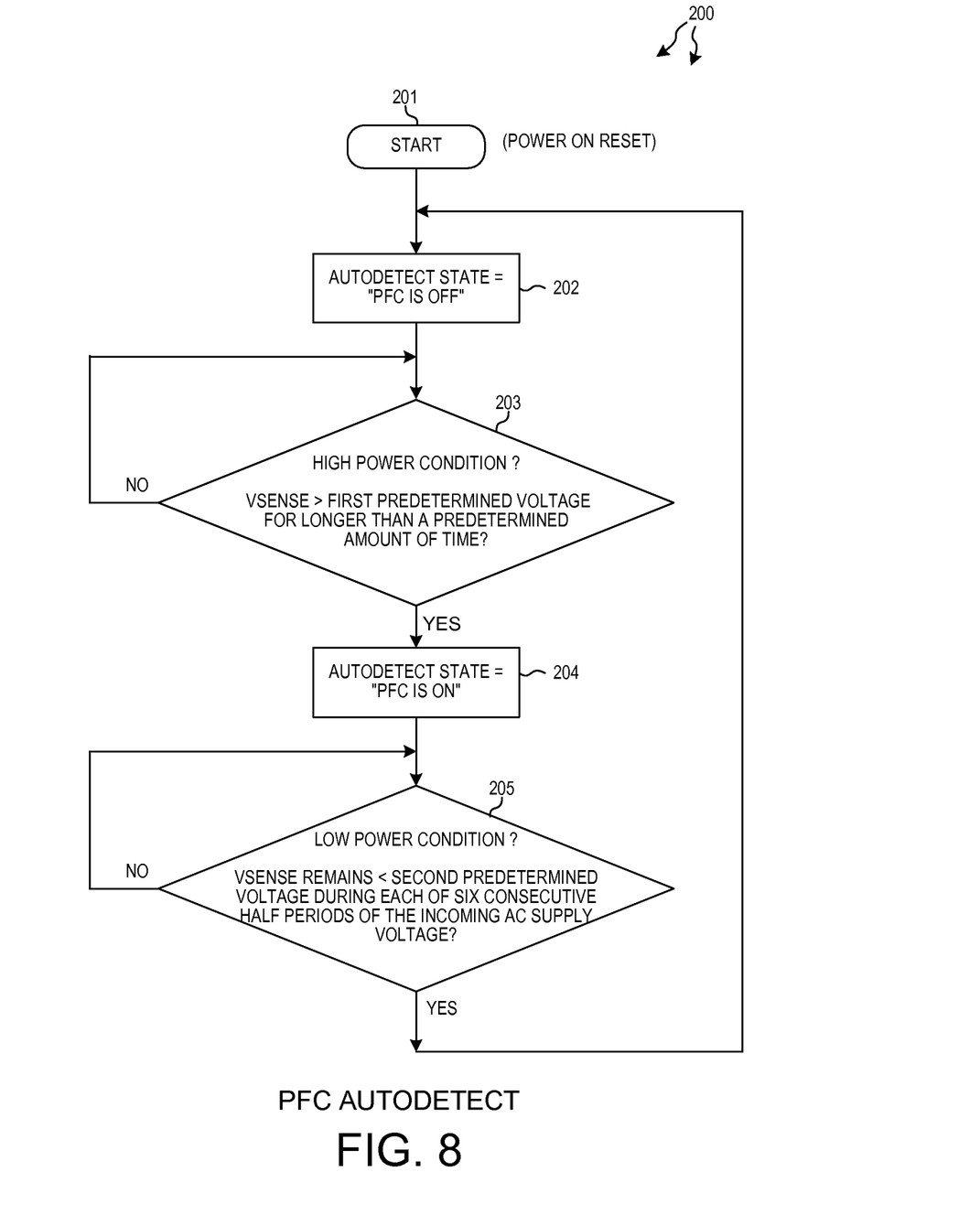
FIG. 8 is a flowchart of a method in accordance with a first novel aspect.

FIG. 8 is a flowchart of a method 200 in accordance with one novel aspect. In this simplified method, both the PFC ON bit and the PFC off bet are cleared. The PFC converter can therefore operate in the autodetect mode. Process flow starts (201) in the PFC Autodetect state (202) in which power factor correction is off. In the circuit of FIG. 7, power on reset POR signal 103 is a digital logic high and SR latch 80 is reset. Process flow stays in this PFC Autodetect state with the PFC PWM being turned off as long as POR signal 103 is asserted to a high digital logic level. When the power on reset condition has passed and the power on reset signal POR 103 transitions to a low digital low level, then the PFC Autodetect circuit 107 determines (203) whether a high power condition exists. In the circuit of FIG. 7, the PFC Autodetect circuit 107 monitors VSENSE and determines whether VSENSE is greater (in any one half period of the incoming VAC signal 59) than a first predetermined voltage for longer than a predetermined amount of time. The first predetermined voltage can set by setting the 4-bit value IMON, and the predetermined amount of time can be set by setting the 5-bit value TMON. If the high power condition is not detected, then the PFC Autodetect circuit 107 continues operating in this PFC Autodetect state and continues monitoring VSENSE and checking for a high power condition. Power factor correction remains off.

If the high power condition is detected, then the PFC Autodetect circuit 107 transitions to the PFC Autodetect state (204) in which power factor correction is turned on. In the example of the circuit of FIG. 7, SR latch 80 is set and signal EN/DISB 56 is asserted to be a high digital logic level. Power factor correction is therefore on. The PFC Autodetect circuit 107 operates in the PFC Autodetect state in which power factor correct is enabled, and determines (205) whether a low power condition exists. In the circuit of FIG. 7, the PFC Autodetect circuit 107 monitors VSENSE and determines whether VSENSE remains below a second predetermined voltage throughout each half period of six consecutive half periods of the incoming AC input supply voltage 59. In the circuit of FIG. 7, the second predetermined voltage is a fixed one sixth of the first predetermined voltage. If the low power condition is not detected, then the PFC Autodetect circuit 107 continues operating in this PFC Autodetect state and continues monitoring VSENSE and checking for a low power condition. If the low power condition is detected, then the PFC Autodetect circuit 107 transitions to the PFC Autodetect state (202) in which power factor correction is turned off. In the example of the circuit of FIG. 7, SR latch 80 is reset and signal EN/DISB 56 is asserted to be a low digital logic level. Power factor correction is therefore off. Due to this operation, power factor correction is automatically turned off under low power conditions when power factor correction is not needed. Turning off the power factor correction circuitry in this condition reduces power consumption as compared to unnecessarily leaving the power factor correction circuit on.

Figure 9:
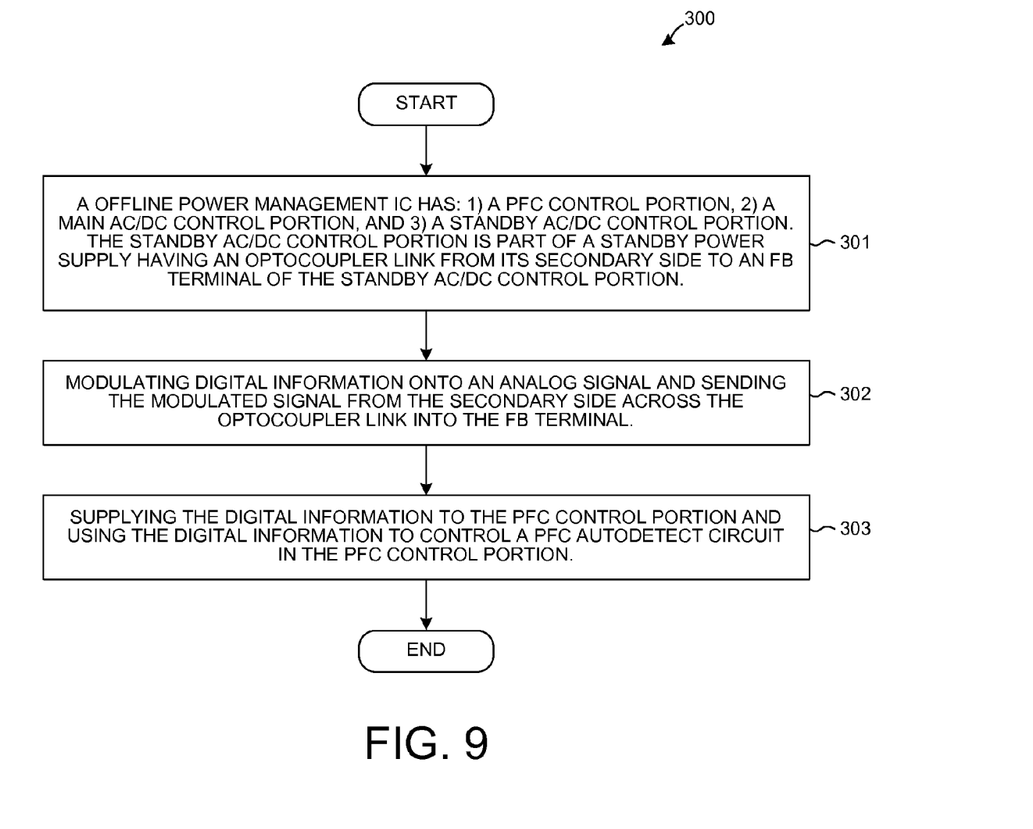
FIG. 9 is a flowchart of a method in accordance with a second novel aspect.

FIG. 9 is a flowchart of a method 300 in accordance with another novel aspect. An Offline Total Power Management Integrated Circuit (OTPMIC) has: 1) a PFC control portion, 2) a main AC/DC control portion, and 3) a standby AC/DC control portion (301). The standby AC/DC control portion is part of a standby power supply. The standby power supply has an optocoupler link that extends from the secondary side of the power supply to an FB terminal of the standby AC/DC control portion of the OTPMIC. Digital information is modulated (302) onto an analog signal. The resulting signal is sent from the secondary side of the standby power supply across the optocoupler link to the FB terminal. Once on the OTPMIC, the digital information is supplied (303) to the PFC control portion. The digital information is used to control a PFC Autodetect circuit in the PFC control portion. A main AC/DC power supply (that is controlled by the main AC/DC control portion of the OTPMIC) can be disabled so that it is not outputting its output supply voltage), but yet the standby power supply continues to operate so the optocoupler link used to communicate the digital information remains operating and available for controlling the PFC Autodetect circuit.

Although certain specific embodiments are described above for instructional purposes, the teachings of this patent document have general applicability and are not limited to the specific embodiments described above. The example of the high power condition set forth above is but one example. A PFC Autodetect circuit in other examples can use different input parameters and a different rule to determine that a high power condition has been detected. Likewise, the example of the low power condition set forth above is but one example. A PFC Autodetect circuit in other examples can use different input parameters and a different rule to determine that a low power condition has been detected. Accordingly, various modifications, adaptations, and combinations of various features of the described embodiments can be practiced without departing from the scope of the invention as set forth in the claims.

What is claimed is:

1. An integrated circuit adapted for coupling to an external AC/DC circuit that includes an external Power Factor Correction (PFC) circuit, wherein the external AC/DC circuit is adapted to receive an AC sinusoidal input signal, wherein the external PFC circuit is adapted to output a DC supply voltage, wherein the AC sinusoidal input signal has a plurality of periods, wherein each period includes two half periods, the integrated circuit comprising:
a first terminal;
a second terminal;
a third terminal;
a PFC control circuit comprising:
a Pulse Width Modulator (PWM) adapted to output a pulse width modulated signal onto the third terminal; and
a PFC Autodetect circuit that monitors a voltage between the first terminal and the second terminal, wherein (a) if a digital enable/disable signal is latched to a first digital logic value then the PFC Autodetect circuit enables the PWM if the voltage exceeds a first predetermined voltage for more than a predetermined amount of time, and (b) if the digital enable/disable signal is latched to a second digital logic value then the PFC Autodetect circuit disables the PWM if a low power condition is detected, wherein the first predetermined voltage is at least in part determined by a first multi-bit digital value stored in the PFC Autodetect circuit, and wherein the predetermined amount of time is at least in part determined by a second multi-bit digital value stored in the PFC Autodetect circuit.

2. The integrated circuit of claim 1, further comprising:
a fourth terminal adapted to receive a signal indicative of a supply voltage received by the external PFC circuit; and
a fifth terminal adapted to receive a signal indicative of the DC supply voltage output by the external PFC circuit.

3. The integrated circuit of claim 1, wherein the PFC Autodetect circuit stores a PFC ON bit, wherein if the PFC ON bit has a first digital logic value then the PFC Autodetect circuit enables the PWM regardless of what the voltage between the first and second terminals is, whereas if the PFC ON bit has a second digital logic value then the PFC Autodetect circuit can disable the PWM if the low power condition is detected.

4. The integrated circuit of claim 1, wherein the PFC Autodetect circuit stores a PFC OFF bit, wherein if the PFC OFF bit has a first digital logic value then the PFC Autodetect circuit disables the PWM regardless of what the voltage between the first and second terminals is, whereas if the PFC OFF bit has a second digital logic value then the PFC Autodetect circuit can enable the PWM if the voltage exceeds the first predetermined value for more than the predetermined amount of time.

5. The integrated circuit of claim 1, wherein the PFC Autodetect circuit stores a PFC ON bit and a PFC OFF bit, wherein if the PFC ON bit is set then the PWM is enabled regardless of what the voltage between the first and second terminals is provided that the PFC OFF bit is not set, whereas if the PFC OFF bit is set then the PFC Autodetect circuit cannot enable the PWM even if the PFC ON bit is set.

6. An integrated circuit adapted for coupling to an external AC/DC circuit that includes an external Power Factor Correction (PFC) circuit, wherein the external AC/DC circuit is adapted to receive an AC sinusoidal input signal, wherein the external PFC circuit is adapted to output a DC supply voltage, wherein the AC sinusoidal input signal has a plurality of periods, wherein each period includes two half periods, the integrated circuit comprising:
a first terminal;
a second terminal;
a third terminal;
a PFC control circuit comprising:
a Pulse Width Modulator (PWM) adapted to output a pulse width modulated signal onto the third terminal; and
a PFC Autodetect circuit that monitors a voltage between the first terminal and the second terminal, wherein (a) if a digital enable/disable signal is latched to a first digital logic value then the PFC Autodetect circuit enables the PWM if the voltage exceeds a first predetermined voltage for more than a predetermined amount of time, and (b) if the digital enable/disable signal is latched to the second digital logic value then the PFC Autodetect circuit disables the PWM if a low power condition is detected, wherein the PFC Autodetect circuit determines if the predetermined amount of time has passed by determining whether a number of periods of a clock signal has elapsed, wherein the number is the second multi-bit digital value.

7. An integrated circuit adapted for coupling to an external AC/DC circuit that includes an external Power Factor Correction (PFC) circuit, wherein the external AC/DC circuit is adapted to receive an AC sinusoidal input signal, wherein the external PFC circuit is adapted to output a DC supply voltage, wherein the AC sinusoidal input signal has a plurality of periods, wherein each period includes two half periods, the integrated circuit comprising:
a first terminal;
a second terminal;
a third terminal;
a standby AC/DC converter controller circuit;
a fourth terminal through which an analog feedback signal is received and is supplied to the standby AC/DC converter controller circuit, wherein digital information is also received in serial fashion onto the fourth terminal along with the analog feedback signal, and wherein the digital information after being received is then stored in a PFC Autodetect circuit; and
a PFC control circuit comprising:
a Pulse Width Modulator (PWM) adapted to output a pulse width modulated signal onto the third terminal; and
the PFC Autodetect circuit that monitors a voltage between the first terminal and the second terminal, wherein (a) if a digital enable/disable signal is latched to a first digital logic value then the PFC Autodetect circuit enables the PWM if the voltage exceeds a first predetermined voltage for more than a predetermined amount of time, and (b) if the digital enable/disable signal is latched to a second digital logic value then the PFC Autodetect circuit disables the PWM if a low power condition is detected.

8. The integrated circuit of claim 7, wherein the digital information includes the first multi-bit digital value and the second multi-bit digital value.

9. The integrated circuit of claim 7, wherein the digital information includes a PFC ON bit, wherein if the PFC ON bit is set then the PWM is enabled regardless of what the voltage between the first and second terminals is.

10. The integrated circuit of claim 7, wherein the digital information includes a PFC OFF bit, wherein if the PFC OFF bit is set then the PWM is disabled regardless of what the voltage between the first and second terminals is.

11. A method comprising:
(a) in a Power Factor Correction (PFC) enabled mode outputting a pulse width modulated signal from a Pulse Width Modulator (PWM) and supplying the pulse width modulated signal from the PWM via a third terminal to a switch of an external PFC circuit, wherein the PWM is enabled in the PFC enabled mode, and wherein the PWM is disabled in a PFC disabled mode;
(b) monitoring a voltage between a first terminal and a second terminal, wherein a sense resistor of the external power factor correction circuit is coupled between the first terminal and the second terminal;
(c) switching from the PFC disabled mode to the PFC enabled mode if the voltage as determined by a PFC Autodetect circuit exceeds a first predetermined voltage for more than a predetermined amount of time; and
(d) switching from the PFC enabled mode to the PFC disabled mode if a low power condition is detected by the PFC Autodetect circuit, wherein the first terminal, the second terminal, the third terminal, the PWM, and the PFC Autodetect circuit are parts of an integrated circuit, wherein the external PFC circuit is external to the integrated circuit, wherein the first predetermined value is at least in part determined by a first multi-bit digital value stored in the PFC Autodetect circuit, and wherein the predetermined amount of time is at least in part determined by a second multi-bit digital value stored in the PFC Autodetect circuit.

12. The method of claim 11, further comprising:
(e) storing a PFC ON bit in the PFC Autodetect circuit, wherein if the PFC ON bit has a first digital logic value then the PWM is enabled regardless of what the voltage between the first and second terminals is, whereas if the PFC ON bit has a second digital logic value then the PFC Autodetect circuit can disable the PWM if the low power condition is detected.

13. The method of claim 11, further comprising:
(e) storing a PFC OFF bit in the PFC Autodetect circuit, wherein if the PFC OFF bit has a first digital logic value then the PWM is disabled regardless of what the voltage between the first and second terminals is, whereas if the PFC OFF bit has a second digital logic value then the PFC Autodetect circuit can enable the PWM if the voltage exceeds the first predetermined value for more than the predetermined amount of time.

14. A method comprising:
(a) in a Power Factor Correction (PFC) enabled mode outputting a pulse width modulated signal from a Pulse Width Modulator (PWM) and supplying the pulse width modulated signal from the PWM via a third terminal to a switch of an external PFC circuit, wherein the PWM is enabled in the PFC enabled mode, and wherein the PWM is disabled in a PFC disabled mode;
(b) monitoring a voltage between a first terminal and a second terminal, wherein a sense resistor of the external power factor correction circuit is coupled between the first terminal and the second terminal;
(c) switching from the PFC disabled mode to the PFC enabled mode if the voltage as determined by a PFC Autodetect circuit exceeds a first predetermined voltage for more than a predetermined amount of time;
(d) switching from the PFC enabled mode to the PFC disabled mode if a low power condition is detected by the PFC Autodetect circuit, wherein the first terminal, the second terminal, the third terminal, the PWM, and the PFC Autodetect circuit are parts of an integrated circuit, and wherein the external PFC circuit is external to the integrated circuit;
(e) controlling an external standby AC/DC converter circuit using a standby AC/DC converter controller circuit, wherein the standby AC/DC converter controller circuit is a part of the integrated circuit;
(f) receiving an analog feedback signal onto the integrated circuit via a fourth terminal and supplying the analog feedback signal to the standby AC/DC converter controller circuit; and
(g) receiving digital information in serial fashion onto the fourth terminal along with the analog feedback signal, wherein the digital information after being received is then stored in the PFC Autodetect circuit.

15. The method of claim 14, wherein the digital information includes a first multi-bit digital value and a second multi-bit digital value, wherein the first multi-bit digital value at least in part determines the first predetermined value, and wherein the second multi-bit digital value at least in part determined the predetermined amount of time.

16. An apparatus, comprising:
a first terminal;
a second terminal, wherein a voltage is present between the first and second terminals;
a third terminal;
a Power Factor Correction (PFC) Pulse Width Modulator (PWM) adapted to output a pulse width modulated signal onto the third terminal; and
means for (a) enabling the PFC PWM if the voltage as determined by the means exceeds a first predetermined voltage for more than a predetermined amount of time, wherein the means is also for (b) disabling the PFC PWM if a low power condition is detected by the means, wherein the first terminal, the second terminal, the third terminal, the PFC PWM, and the means are parts of an integrated circuit, wherein the first predetermined value is at least in part determined by a first multi-bit digital value stored in the means, and wherein the predetermined amount of time is at least in part determined by a second multi-bit digital value stored in the means.

* * * * *